Feb. 5, 1935.  A. T. K. TSENG  1,990,149

HYDRAULIC BRAKE FLUID

Original Filed July 26, 1930

FURANE RING

FURFURAL ALDEHYDE

FURFURYL ACETATE

FURFURYL ALCOHOL

FURANE

INVENTOR.
ANDREW T. K. TSENG
BY Williams, Bradbury, McCaleb & Hinkle
ATTORNEYS.

Patented Feb. 5, 1935

1,990,149

UNITED STATES PATENT OFFICE 1,990,149

HYDRAULIC BRAKE FLUID

Andrew T. K. Tseng, New York, N. Y., assignor to Hydraulic Brake Company, Detroit, Mich., a corporation of California Original application July 26, 1930, Serial No. 471,048. Divided and this application March 23, 1934, Serial No. 716,991.

5 Claims. (Cl. 252—5)

This invention relates to fluid compositions and more particularly to fluid compositions for use in fluid pressure systems such as hydraulic brakes.

This application is a division of my pending application Serial Number 471,048, filed July 26, 1930, and is made in accordance with requirements of the United States Patent Office under provision of Rule 42.

An object of my invention is to provide a brake fluid which will not attack the rubber or metal parts of a brake system.

Another object is to provide a brake fluid which will not volatilize in use.

Another object is to provide a brake fluid which has an extremely low rate of evaporation.

Another object is to provide a brake fluid which will leave a protective coating on the parts of the brake system.

Another object is to provide a brake fluid which has a low freezing point.

Another object is to provide a brake fluid which has a substantially uniform viscosity between its freezing and boiling points.

Other objects of the invention will appear from the following description taken in connection with the accompanying drawing which forms a part of this specification, and in which,—

It is important that the fluid be of such character that it will not attack any of the metals used in the various parts of the brake system. It is of utmost importance that the fluid should not attack the rubber of the flexible hose or the rubber packing cups employed in the system. The latter is particularly essential as any swelling or other deterioration of these packing cups would seriously interfere with the operation of the system.

It is also important that the fluid have a sufficiently high temperature of vaporization to withstand high temperatures resulting from prolonged application of the brakes without vaporization, as vaporization of the brake fluid would create gas pockets in the brake system which, under certain conditions, would seriously interfere with the operation of the brakes.

Figure 1:
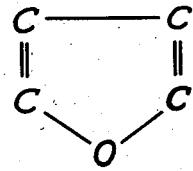
Figure 1 is a graphic formula of the furane ring per se.
Figure 2:
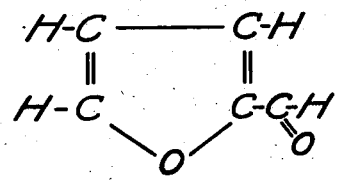
Figures 2, 3, 4 and 5 are the graphic formulas of the more important furane ring compounds comprehended in my invention.
Figure 4:
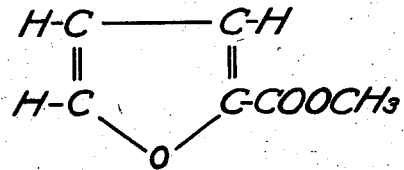
Figure 3:
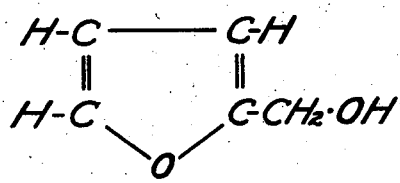
Figure 5:
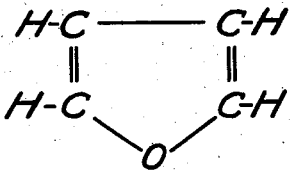

It has been found that furfural aldehyde and other furane ring compounds are eminently suited as fluids for hydraulic brake systems and meet all of the exacting requirements for such fluids. The term "furane ring compound" is to be interpreted as a chemical compound which contains the furane ring illustrated in Fig. 1 of the accompanying drawing. For purposes of convenience, such a compound can be considered as obtained from furane by the substitution of an element or group of elements for one or more of the hydrogen atoms of furane.

With the present knowledge of chemical processes for the manufacture of furane ring compounds, furfural aldehyde is by far the cheapest furane ring compound now obtainable and for this reason alone it is at present the most practical furane ring compound brake fluid. Furfuryl alcohol, furfural acetate, and numerous other furane ring compounds are equally well adapted for use as brake fluids and many of these furane ring compounds, such as furfuryl alcohol, furfuryl acetate, and several others, are even better adapted for brake fluid use than is furfural aldehyde because of their lower freezing temperatures.

It has been found that what is known commercially as "technical" furfural aldehyde will withstand a temperature of minus 60° F. without freezing, regardless of the length of exposure to such temperature. This is a sufficiently low freezing point for ordinary conditions but vehicles using hydraulic brake systems are sometimes subjected to lower temperatures than minus 60° F. In order to provide a brake fluid which will withstand temperature lower than minus 60° F., it is necessary to add what may be termed a "dilutent" to furfural aldehyde in order to lower its freezing point. Wherever the word "dilutent" is used in this specification, it is to be understood as meaning a substance which is added solely for the purpose of reducing the freezing temperature and has no significance whatsoever in so far as the viscosity of the base substance is concerned. Many substances are suitable for use as dilutents but the following substances are thought to be best suited for such use at the present time: ethylene dichloride, diethylene glycol, ethylene glycol, monoethylether ethylene glycol, monoethylether diethylene glycol, ethyleneglycolmonoethylether acetate, diethylene oxide, ethyleneglycolmonobutylether, monoacetate glycol, butyl ether diethylene glycol, furfuryl alcohol, furfuryl acetate, propyl furoate, methyl furoate, ethyl furoate, butyl foroate, butyl alcohol, diacetone alcohol.

A desirable brake fluid has a rate of evaporation much lower than that dictated by ordinary usage in a brake system of a motor vehicle in operation so that the fluid may be used to provide a coating which will protect the surfaces of such parts for replacement and repair against corrosion even after practically all of the brake fluid has evaporated.

Therefore, while furfural aldehyde evaporates very slowly it is found desirable to add a substance which will still further retard the rate of evaporation and which will increase the protective coating left on the parts after substantially all of the brake fluid has evaporated. Substances added for this purpose are referred to herein as "retardants".

Many substances can be added to furfural aldehyde as retardants. However, it is believed that the most satisfactory retardants now known are as follows: ethyleneglycolmonobutylether, diethylene glycol, monoacetate glycol, butyl ether diethylene glycol, ethylene glycol, olive oil, mineral oil (white), castor-oil, cocoanut oil, halowax oil, cyclohexanol, diethylphthalate, dibutylphthalate, furfuryl acetate, furfuryl alcohol, methyl furoate, propyl furoate, ethyl furoate, butyl furoate.

It should be noted that several substances are listed both as dilutents and retardants since such substances have the triple characteristics of reducing the rate of evaporation, lowering the freezing point, and improving the protective coating which is left as a residue on the parts exposed to the brake fluid.

Diethylene glycol is included in the above lists of dilutents and retardants in spite of the fact that this substance attacks iron and steel. Where diethylene glycol is used it is contemplated that certain parts of the system such as the wheel cylinders and reservoir, including the master cylinder therein, are die castings, the usual die-cast metal being a non-ferrous alloy of zinc, tin, magnesium, aluminum and lead. In such a system the springs in the cylinders could be either brass springs or steel springs coated with nickel or chromium. Such a non-ferrous brake system is entirely practical from a commercial standpoint, with the present improved process and reduced cost of die-casting.

As previously pointed out, furfural aldehyde alone is an entirely satisfactory brake fluid for ordinary operating conditions. The following specific examples of brake fluids comprising furfural aldehyde mixed with substances which lower its freezing point, reduce its rate of evaporation and improve the protective coating left as a residue on the parts of brake systems, are typical examples of what may be considered as universal brake fluids capable of fulfilling all conditions.

I

| | Per cent |
|---|---|
| Furfural aldehyde | 70 to 90 |
| Furfuryl alcohol | 10 to 30 |

II

| | Per cent |
|---|---|
| Furfural aldehyde | approximately 78 |
| Furfuryl alcohol | approximately 20 |
| Cyclo-hexanol | approximately 2 |

III

| | Per cent |
|---|---|
| Furfural aldehyde | 50 to 70 |
| Diethylene glycol | 30 to 50 |

IV

| | Per cent |
|---|---|
| Furfural aldehyde | 70 to 90 |
| Methyl furoate | 10 to 30 |

V

| | Per cent |
|---|---|
| Furfural aldehyde | 40 to 95 |
| Castor-oil | 1 to 5 |
| Butyl ether diethylene glycol | 4 to 55 |

VI

| | Per cent |
|---|---|
| Furfural aldehyde | 50 to 70 |
| Glycolmonoacetate | 10 to 30 |
| Diethyleneglycolmonobutylether | 10 to 40 |

While I have described my invention in detail as applied to hydraulic brake systems, it is to be understood that some features of my invention are equally applicable to hydraulic power transmission means other than that used in the application of brakes.

In this specification the chemical term "furane ring compound" is used to describe the various chemical compounds which are commonly known in commercial parlance as "furfural derivatives" because of the fact that "furfural", (as furfural aldehyde is known commercially) is the basis from which all other furane ring compounds are obtained by the present commercial processes.

While the preferred embodiments of the invention have been described in detail, it is not my intention to limit the scope of the invention to the particular embodiments, or otherwise than by the terms of the appended claims.

What I claim and desire to secure by United States Letters Patent is:

1. A solution for the hydraulic transmission of power including furfural aldehyde and glycolmonoacetate.

2. A solution for the hydraulic transmission of power comprising furfural aldehyde and diethyleneglycolmonobutylether.

3. A solution for the hydraulic transmission of power comprising furfural aldehyde, glycolmonoacetate and diethyleneglycolmonobutylether.

4. A solution for the hydraulic transmission of power comprising a furane ring compound and an acetate.

5. A solution for the hydraulic transmission of power comprising a furane ring compound and butyl ether diethylene glycol.

ANDREW T. K. TSENG.